United States Patent Office 2,767,156
Patented Oct. 16, 1956

2,767,156

VULCANIZATION OF SYNTHETIC RUBBER WITH METHYLENE DERIVATIVES OF DIHYDRIC PHENOLS

Pliny O. Tawney, Passaic, and Julian R. Little, Packanack Lake, N. J., assignors to United States Rubber Company, New York, N. Y., a corporation of New Jersey No Drawing. Application March 11, 1952, Serial No. 276,038

16 Claims. (Cl. 260—41.5)

This invention relates to the vulcanization of synthetic rubber selected from the group consisting of polymers of aliphatic conjugated diolefins and copolymers of aliphatic conjugated diolefins with other copolymerizable monomeric material, which copolymers contain copolymerized therein at least 25% of aliphatic conjugated diolefin, by means of certain derivatives of hydroquinone dialkyl ether, by heating a mixture of the rubber, one of said derivatives, and carbon black.

The method of the present invention comprises heating a mixture of synthetic rubber of the type defined above, carbon black in an amount equal to at least about 15 parts per 100 parts of said rubber, and the selected hydroquinone dialkyl ether derivative.

The hydroquinone dialkyl ether derivatives used in the practice of our invention are those wherein the two- and five-positions are substituted with selected methylene-containing groups capable of condensing with the rubber to form cross-linkages. Such hydroquinone dialkyl ether derivatives have the following structure:

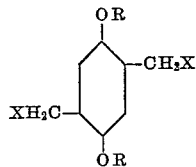

where R is alkyl, especially lower alkyl, and X is selected from the group consisting of:

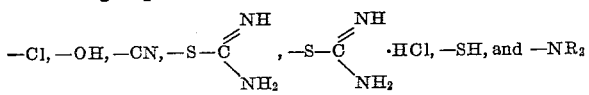

Our invention is based upon the discovery that derivatives of hydroquinone dialkyl ether which have the above structure are extremely effective vulcanizing agents for synthetic rubbers of the type mentioned above and more fully described below, when such vulcanizing agents are employed in the presence of at least 15 parts of carbon black per 100 parts of the rubber.

The vulcanizing agents used in our invention can easily be made by synthetic procedures well-known in the art. The dialkyl ether of hydroquinone is reacted with formaldehyde and hydrogen chloride in known manner to obtain a compound of the above formula wherein X is Cl. This compound can then be converted to corresponding compounds of the above formula wherein X is other than Cl by well-known techniques.

The vulcanizing agents of the present invention can be used in widely varying amounts. We generally employ from 0.5 to 8 parts, and we prefer to employ from 1 to 5 parts, of the above-named derivatives of hydroquinone dialkyl ether per 100 parts of the rubber.

It is essential, in the practice of our invention, that at least about 15 parts of carbon black be used per 100 parts of the rubber. The type of carbon black is not critical. The black can be any of the reinforcing, semi-reinforcing or non-reinforcing carbon blacks commonly used in the rubber industry. Examples are channel blacks, furnace blacks, and acetylene black. Examples of commercial blacks which can be used include Philblack O, Wyex, Kosmos 80, Statex B, Spheron 6, P–33, Thermax and Shawninigan. Of course, the physical properties of the vulcanizates will vary considerably depending upon the type of carbon black used, as is well known to anyone skilled in the art of rubber compounding. The maximum amount of carbon black is not critical so far as vulcanization is concerned although those skilled in the art will understand that the amount of black to be used in excess of that required for vulcanization is governed by the degree of reinforcement desired or by other practical criteria.

The present invention is applicable to synthetic rubbers containing at least 25% of combined aliphatic conjugated diene, e. g., butadiene, isoprene or chlorobutadiene. Types of synthetic rubber to which the invention is applicable include rubbery homopolymers of butadiene-1,3 and its homologs (especially isoprene) and of chlorinated derivatives of butadiene-1,3 and its homologs (especially 2-chlorobutadiene-1,3) and copolymers of butadiene-1,3 and its homologs with compounds containing a single terminal vinylidene group $CH_2=C<$. Examples of such compounds are styrene, monovinylpyridine, acrylonitrile, alkyl acrylates, etc. Such copolymerizable materials may be referred to as monoethylenically unsaturated monomers. Examples of synthetic rubbers to which the invention is applicable include butadiene-styrene rubbery copolymers, styrene-isoprene rubbery copolymers, rubbery polybutadiene, rubbery polyisoprene, butadiene-monovinylpyridine rubbery copolymers, butadiene-acrylonitrile rubbery copolymers, neoprene, and butadiene-methyl acrylate rubbery copolymers.

In practicing our invention, the synthetic rubber, the carbon black, and the vulcanizing agent, together with any other desired compounding material such as other fillers, pigments, dyes, softeners, or blowing agents, are mixed in any convenient manner used in the rubber industry, e. g., on a rubber mill or in an internal mixer, until a uniform intimate mixture is obtained. The compounded rubber is then converted to any desired shape and size and is vulcanized by heating it at temperatures ranging from 150° to 250° C., and preferably at 165° to 225° C., in any commonly known manner as in a mold under pressure or in an open container in an oven.

The vulcanization procedure of the present invention has many advantages over previously known vulcanizing processes. Among these are the following:

1. The rubber stocks vulcanized by the new process have a far better resistance to aging at high temperature than does rubber vulcanized conventionally with sulfur. Thus, these stocks are especially useful in products which must be kept for considerable periods of time at high temperatures. Such products are curing bags for tires, rubber motor mountings, steam hose, gaskets and belts for hot machinery, conveyor belts for moving hot materials, flexible hot air ducts, hot water bottles, etc.

2. By having considerable amounts of carbon black present, synthetic rubber can be vulcanized with small amounts of our vulcanizing agent. Heretofore, a much larger proportion of a derivative of a monohydric phenol was needed to vulcanize rubber in the absence of carbon black. Van der Meer (Dutch Patent 58,664 and Rubber Chemistry and Technology, 18, 853–73 (1934) and 20, 173–181 (1945)) reported that in most cases 40–50 parts (in one case as little as 10 parts) of a phenolic compound were needed. It is well known that the addition of carbon black to a sulfur-vulcanized stock decreases the effectiveness of the accelerator and stearic acid; i. e., more of these agents are required in a rubber stock containing carbon black than in a gum rubber stock, to attain an equivalent degree of vulcanization.

Furthermore, the sulfur cannot be decreased in amount because of the presence of carbon black. Consequently, this great increase in the effectiveness of the phenolic vulcanizing agents of the present invention due to the addition of the carbon black is unexpected.

3. In the absence of carbon black Van der Meer was unable to vulcanize rubber with derivatives of monohydric phenols in which the phenolic hydroxyl group was replaced by an alkoxyl group. The advantage of using carbon black in the rubber mixture is evident.

4. The compounded but unvulcanized stocks can be processed at higher temperatures without scorching than can stocks vulcanized by sulfur. This is particularly advantageous when shaping articles by injection molding.

The following examples show some of the phenolic derivatives which can be used for vulcanizing rubber. All parts are by weight.

*Example 1*

Each of the following vulcanizing agents was mixed separately, in the amounts shown in the table below, on a mill with 155 parts of GR-S X537 (a premixed master-batch of 100 parts of butadiene-styrene copolymer (71/29) made at 41° F. and 55 parts of carbon black); the resulting mixtures were vulcanized in a press for 60 minutes at 195° C.; the vulcanizates were then tested at room temperature. The data were as follows:

| 1,4-Dimethoxybenzene derivative (parts) | A | B | C | D | E |
|---|---|---|---|---|---|
| 2,5-Bis-(cyanomethyl)- | 2 | | | | |
| 2,5-Bis-(mercaptomethyl)- | | 3 | | | |
| 2,5-Bis-(chloromethyl)- | | | 5 | | |
| 2,5-Bis-(guanylmercaptomethyl)- | | | | 2 | |
| 2,5-Bis-(guanylmercaptomethyl)-dihydrochloride | | | | | 5 |

TEST ON STOCKS

| | | | | | |
|---|---|---|---|---|---|
| Tensile Strength, p. s. i. | 1,605 | 1,695 | 1,535 | 1,625 | 1,675 |
| Elongation, percent | 490 | 255 | 335 | 495 | 385 |
| Modulus at 200% elongation p. s. i. | 495 | 1,165 | 770 | 505 | 720 |

It is evident that all of these compounds, containing widely varying radicals on the —CH₂— groups, act as vulcanizing agents for the GR-S. It is also apparent that all the stocks are about alike except stock B, which is somewhat more "tightly" vulcanized than the rest.

A control stock containing no vulcanizing agent, cured in the same way as stocks A to E, had a tensile strength of 180 p. s. i., elongation of 670% and modulus at 200% elongation of 110 p. s. i.

*Example 2*

A stock consisting of 155 parts of GR-S X537 and 5 parts of 2,5-bis-(guanylmercaptomethyl)-1,4-dimethoxybenzene dihydrochloride was mixed, divided into portions which were vulcanized for 60 minutes at the temperatures shown, and tested at room temperature.

| | F-1 | F-2 |
|---|---|---|
| Vulcanization temperature °C | 165 | 195 |
| Tensile strength (p. s. i.) | 515 | 1,675 |
| Elongation, percent | 410 | 385 |
| Modulus at 200% elongation (p. s. i.) | 325 | 720 |

This example shows that the temperature may be varied considerably. Stock F-1 obviously should be vulcanized a much greater length of time in order to attain optimum physical properties. However, it is usually more practical to raise the vulcanization temperature, as was done in the case of stock F-2.

Some of the materials which can be used as vulcanizing agents for rubber according to this invention are 2,5-bis-(cyanomethyl)-1,4-dimethoxybenzene, 2,5-bis-(hydroxymethyl)-1,4-dimethoxybenzene, 2,5-bis-(mercaptomethyl)-1,4-dimethoxybenzene, 2,5-bis-(dimethylaminomethyl)-1,4-dimethoxybenzene, 2,5-bis-(chloromethyl)-1,4-dimethoxybenzene, 2,5-bis-(guanylmercaptomethyl)-1,4-dimethoxybenzene and its hydrochloride, 2,5-bis-(chloromethyl)-1,4-diethoxybenzene, and 2,5-bis-(di-n-propylaminomethyl)-1,4-diethoxybenzene. It is evident that a wide variety of compounds may be used as vulcanizing agents without departing from the spirit of this invention.

It is well known that many dimercaptans act as vulcanizing agents for rubber. For example, Hull et al., Ind. Eng. Chem. 40, 513-17 (1948), have shown that ethylene dimercaptan and other dimercaptans vulcanize natural and synthetic rubber. As the corresponding hydroxy, cyano and chloro compounds ethylene glycol, ethylene dicyanide and ethylene dichloride show no vulcanizing effect whatever on rubber it is entirely unexpected that the compounds of this invention in which X is —OH, —CN, or —Cl should be excellent vulcanizing agents. Since the vulcanized stocks shown in Example 1 are all essentially alike, except as noted for the stock (B) vulcanized with the dimercaptan, it seems likely that the actual vulcanizing agent is an intermediate common to all of them and formed in situ by the action of heat. Such an intermediate might be somewhat similar to the "active methylene" intermediates postulated by Van der Meer, Rubber Chem. and Tech. 18, 853-73 (1945), to explain the vulcanization of rubber by certain derivatives of monohydric phenols. However, his proposed mechanism is certainly not entirely applicable to this new invention because he specifically states that phenolic ethers would not be expected to form the methylene intermediate.

The simple dimercaptans react with rubber rapidly even at room temperature (Hull, loc. cit.), whereas the dimercaptan vulcanizing agents of this invention (stock B) require a vulcanization temperature in the same range as the non-sulfur vulcanizing agents. Therefore, it is probable that the predominant mechanism of vulcanization by both the mercaptans and the non-sulfur-containing materials of this invention is the same, i. e., the formation of the active intermediate in situ. In other words, the presence of the mercaptan groups per se is presumed to be unimportant. However, stock B seems sufficiently more tightly vulcanized than the others of Example 1 to suggest the possibility that the dimercaptan may also be vulcanizing the rubber to some extent by the mechanism involved in vulcanization by ethylene dimercaptan, this second method of vulcanization thus having an additive effect to the first or being of a type causing more cross-linking of the rubber chains.

While the invention has been described with particular reference to the use of hydroquinone dialkyl ether derivatives, of the class defined above, in which the alkyl group is methyl or ethyl, it will be understood that the alkyl group may be constituted of any aliphatic hydrocarbon radical, and may contain, for example, as many as 20 carbon atoms. However, the alkyl radical will most commonly be a lower alkyl radical, containing from 1 to 6 carbon atoms.

The various compounds used as vulcanizing agents in this invention may be prepared, as indicated previously, by conventional methods. Thus, 2,5-bis-chloromethyl-1,4-dimethoxybenzene may be made from hydroquinone dimethyl ether, hydrogen chloride and formaldehyde as described by Wood and Gibson, JACS 71, 393 (1949). 2,5-bis-cyanomethyl-1,4-dimethoxybenzene may be made from the foregoing chloromethyl compound by reacting it with potassium cyanide, also as described by Wood and Gibson, loc. cit.

2,5-bis-(guanylmercaptomethyl)-1,4-dimethoxybenzene dihydrochloride may also be made from the foregoing chloromethyl compound, by heating it with an excess of thiourea in alcohol. The dihydrochloride precipitates quickly as a white solid in almost quantitative yield. In this preparation there is nothing critical about the temperature of the reaction nor about the relative proportions of the reactants; an excess of the thiourea over the theoretical stoichiometric quantity is recommended simply to make the maximum use of the more expensive starting chloromethyl compound, for reasons of economy. The experimental details for this preparation are purely conventional, and the experimental procedure shown in Organic Syntheses 30, 35–36 (1950) for the preparation of analogous compounds may be followed exactly if desired.

The corresponding free base is made from the dihydrochloride by careful addition of aqueous alkali to a cold, stirred aqueous solution of the hydrochloride according to the well-known standard procedure for isolating isothioureas from their corresponding hydrochlorides as disclosed, for example, by Bernthsen and Klinger, Berichte 12, 574 (1879); or Olin and Davis, Journal American Chemical Society, 52, 3322 (1930). The product precipitates as a white or pale pink solid of indeterminate melting point. Those skilled in the art will recognize this preparation of the free base as an obvious application of the universally employed method for converting the salt of any relatively weak base to the free acid, by treating such salt with a stronger base. As will be apparent to the skilled organic chemist, the proportions and reaction conditions in such a procedure are in no way critical. Careful addition of the alkali, with vigorous stirring, is recommended because a local high concentration of alkali might be harmful if it existed more than momentarily.

2,5-bis-hydroxymethyl-1,4-dimethoxybenzene may be prepared as described by Euler et al., Chemical Abstracts, vol. 34, col. 7877–8 (November 24, 1940).

A 2,5-bis-(dialkylaminomethyl)-1,4-dimethoxybenzene may be made by reacting the foregoing chloromethyl compound with an excess of the appropriate dialkylamine, followed by careful addition of aqueous alkali to the cold solution. This will be recognized as a specific application of the well-known method of making a tertiary amine by addition of an alkyl halide to a secondary amine (Whitmore, "Organic Chemistry," page 76, D. Van Nostrand, 1937; Emde, Berichte 42, 2593 (1909); Jackson and Wingate, Am. Chem. J. 9, 79; and Tiffeneau and Fuhrer, Bull. Soc. Chim. de France (4) 15, 168).

2,5-bis-mercaptomethyl-1,4-dimethoxybenzene may be made by heating the foregoing bis-(guanylmercaptomethyl) hydrochloride, or its free base, with an excess of aqueous alkali in an inert atmosphere, followed by careful addition of acid to the cold solution. For experimental details on preparations of this kind reference may again be had to the "Organic Syntheses" preparation referred to previously in connection with the 2,5-bis-cyanomethyl-1,4-dimethoxybenzene. The product has an ill-defined melting point, probably due to decomposition or partial oxidation to disulfides.

This application is a continuation-in-part of our application Serial No. 228,124, filed May 24, 1951, and now abandoned.

Having thus described our invention, what we claim and desire to protect by Letters Patent is:

1. The method of vulcanizing synthetic rubber selected from the group consisting of homopolymers of aliphatic conjugated diolefins and copolymers of an aliphatic conjugated diolefin with a monoethylenically unsaturated monomer containing a single terminal vinylidene group copolymerizable with said diolefin to form a rubbery copolymer which copolymers contained copolymerized therein at least 25% of said aliphatic conjugated diolefin, which comprises heating at a temperature of from 150° to 250° C., a mixture of said rubber, carbon black in an amount equal to at least 15 parts per hundred parts of said rubber, and a vulcanizing agent having the following structural formula

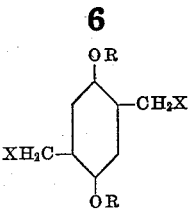

where R is alkyl and X is selected from the group consisting of

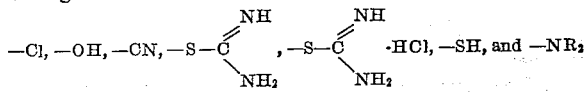

the said vulcanizing agent being present in amount sufficient to vulcanize the said rubber.

2. The method of claim 1 wherein the amount of said vulcanizing agent ranges from 0.5 to 8 parts per hundred parts of said rubber.

3. The method of claim 1 wherein said synthetic rubber is a copolymer of butadiene and styrene.

4. The method of vulcanizing synthetic rubber selected from the group consisting of homopolymers of aliphatic conjugated diolefins and copolymers of an aliphatic conjugated diolefin with a monoethylenically unsaturated monomer containing a single terminal vinylidene group copolymerizable with said diolefin to form a rubbery copolymer, which copolymers contain copolymerized therein at least 25% of said aliphatic conjugated diolefin, which comprises heating, at a temperature of from 150° to 250° C., a mixture of said rubber, carbon black in an amount equal to at least 15 parts per hundred parts of said rubber, and a vulcanizing agent having the following structural formula

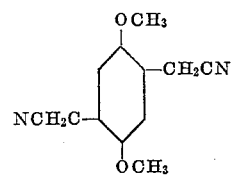

the said vulcanizing agent being present in amount sufficient to vulcanize the said rubber.

5. The method of vulcanizing synthetic rubber selected from the group consisting of homopolymers of aliphatic conjugated diolefins and copolymers of an aliphatic conjugated diolefin with a monoethylenically unsaturated monomer containing a single terminal vinylidene group copolymerizable with said diolefin to form a rubbery copolymer, which copolymers contain copolymerized therein at least 25% of said aliphatic conjugated diolefin, which comprises heating, at a temperature of from 150° to 250° C., a mixture of said rubber, carbon black in an amount equal to at least 15 parts per hundred parts of said rubber, and a vulcanizing agent having the following structural formula

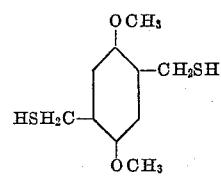

the said vulcanizing agent being present in amount sufficient to vulcanize the said rubber.

6. The method of vulcanizing synthetic rubber selected from the group consisting of homopolymers of aliphatic conjugated diolefins and copolymers of an aliphatic conjugated diolefin with a monoethylenically unsaturated monomer containing a single terminal vinylidene group copolymerizable with said diolefin to form a rubbery copolymer, which copolymers contain copolymerized therein at least 25% of said aliphatic conjugated diolefin, which comprises heating, at a temperature of from 150° to 250° C., a mixture of said rubber, carbon black in an amount equal to at least 15 parts per hundred parts of said rubber, and a vulcanizing agent having the following structural formula

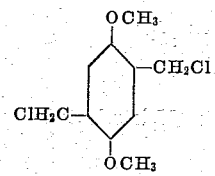

the said vulcanizing agent being present in amount sufficient to vulcanize the said rubber.

7. The method of vulcanizing synthetic rubber selected from the group consisting of homopolymers of aliphatic conjugated diolefins and copolymers of an aliphatic conjugated diolefin with a monoethylenically unsaturated monomer containing a single terminal vinylidene group copolymerizable with said diolefin to form a rubbery copolymer, which copolymers contain copolymerized therein at least 25% of said aliphatic conjugated diolefin, which comprises heating, at a temperature of from 150° to 250° C., a mixture of said rubber, carbon black in an amount equal to at least 15 parts per hundred parts of said rubber, and a vulcanizing agent having the following structural formula

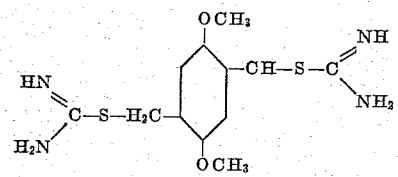

the said vulcanizing agent being present in amount sufficient to vulcanize the said rubber.

8. The method of vulcanizing synthetic rubber selected from the group consisting of homopolymers of aliphatic conjugated diolefins and copolymers of an aliphatic conjugated diolefin with a monoethylenically unsaturated monomer containing a single terminal vinylidene group copolymerizable with said diolefin to form a rubbery copolymer, which copolymers contain copolymerized therein at least 25% of said aliphatic conjugated diolefin, which comprises heating, at a temperature of from 150° to 250° C., a mixture of said rubber, carbon black in an amount equal to at least 15 parts per hundred parts of said rubber, and a vulcanizing agent having the following structural formula

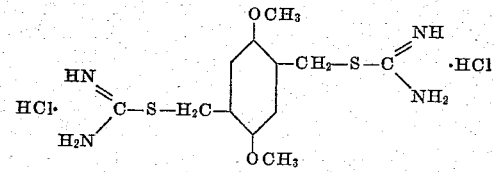

the said vulcanizing agent being present in amount sufficient to vulcanize the said rubber.

9. A vulcanizate of a mixture of synthetic rubber seletced from the group consisting of homopolymers of aliphatic conjugated diolefins and copolymers of an aliphatic conjugated diolefin and a monoethylenically unsaturated monomer containing a single terminal vinylidene group copolymerizable with said diolefin to form a rubbery copolymer, which copolymers contain copolymerized therein at least 25% of said aliphatic conjugated diolefin with carbon black in an amount equal to at least 15 parts per hundred parts of said rubber and a vulcanizing agent having the following structural formula:

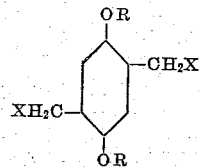

where R is alkyl and X is selected from the group consisting of

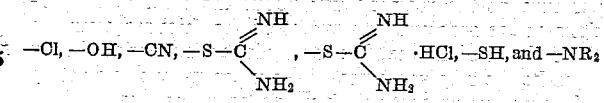

the said vulcanizing agent being present in amount sufficient to vulcanize the said rubber.

10. A vulcanizate as set forth in claim 9 wherein the amount of said vulcanizing agent ranges from 0.5 to 8 parts per 100 parts of said rubber.

11. A vulcanizate as set forth in claim 9 wherein said synthetic rubber is a copolymer of butadiene and styrene.

12. A vulcanizate of a mixture of synthetic rubber selected from the group consisting of homopolymers of aliphatic conjugated diolefins and copolymers of an aliphatic conjugated diolefin and a monoethylenically unsaturated monomer containing a single terminal vinylidene group copolymerizable with said diolefin to form a rubbery copolymer, which copolymers contain copolymerized therein at least 25% of said aliphatic conjugated diolefin, carbon black in an amount equal to at least 15 parts per 100 parts of said rubber, and a vulcanizing agent having the following structural formula:

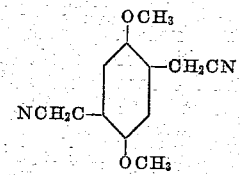

the said vulcanizing agent being present in amount sufficient to vulcanize the said rubber.

13. A vulcanizate of a mixture of synthetic rubber selected from the group consisting of homopolymers of aliphatic conjugated diolefins and copolymers of an aliphatic conjugated diolefin and a monoethylenically unsaturated monomer containing a single terminal vinylidene group copolymerizable with said diolefin to form a rubbery copolymer, which copolymers contain copolymerized therein at least 25% of said aliphatic conjugated diolefin, carbon black in an amount equal to at least 15 parts per 100 parts of said rubber, and a vulcanizing agent having the following structural formula:

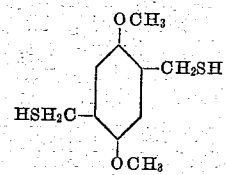

the said vulcanizing agent being present in amount sufficient to vulcanize the said rubber.

14. A vulcanizate of a mixture of synthetic rubber selected from the group consisting of homopolymers of aliphatic conjugated diolefins and copolymers of an aliphatic conjugated diolefin and a monoethylenically unsaturated monomer containing a single terminal vinylidene group copolymerizable with said diolefin to form a rubbery copolymer, which copolymers contain copolymerized therein at least 25% of said aliphatic conjugated diolefin, carbon black in an amount equal to at least 15 parts per 100 parts of said rubber, and a vulcanizing agent having the following structural formula:

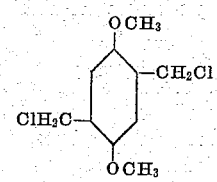

the said vulcanizing agent being present in amount sufficient to vulcanize the said rubber.

15. A vulcanizate of a mixture of synthetic rubber selected from the group consisting of homopolymers of aliphatic conjugated diolefins and copolymers of an aliphatic conjugated diolefin and a monoethylenically unsaturated monomer containing a single terminal vinylidene group copolymerizable with said diolefin to form a rubbery copolymer, which copolymers contain copolymerized therein at least 25% of said aliphatic conjugated diolefin, carbon black in an amount equal to at least 15 parts per 100 parts of said rubber, and a vulcanizing agent having the following structural formula:

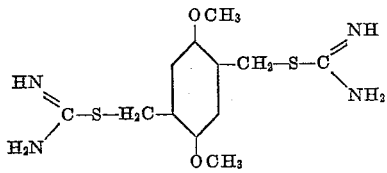

the said vulcanizing agent being present in amount sufficient to vulcanize the said rubber.

16. A vulcanizate of a mixture of synthetic rubber selected from the group consisting of homopolymers of aliphatic conjugated diolefins and copolymers of an aliphatic conjugated diolefin and a monoethylenically unsaturated monomer containing a single terminal vinylidene group copolymerizable with said diolefin to form a rubbery copolymer, which copolymers contain copolymerized therein at least 25% of said aliphatic conjugated diolefin, carbon black in an amount equal to at least 15 parts per 100 parts of said rubber, and a vulcanizing agent having the following structural formula:

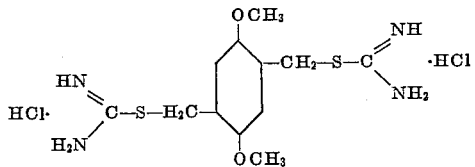

the said vulcanizing agent being present in amount sufficient to vulcanize the said rubber.

References Cited in the file of this patent

UNITED STATES PATENTS

| | | |
|---|---|---|
| 1,887,396 | Brunner | Nov. 8, 1932 |
| 2,500,517 | Carswell | Mar. 14, 1950 |

FOREIGN PATENTS

| | | |
|---|---|---|
| 345,939 | Great Britain | Mar. 16, 1931 |

OTHER REFERENCES

Serial No. 357,662, Wildschut (A. P. C.), published April 20, 1943.
Bernthsen et al.: Berichte 12, 574 (1879).
Olin et al.: Jour. Am. Chem. Soc. 52, 3322 (1930).
Whitmore: "Organic Chemistry," page 76 (1937).
Emde, Berichte 42, 2593 (1909).
Jackson et al.: Am. Chem. J., 9, 79.
Tiffeneau et al.: Bull. Soc. Chim. (France) (4), 15, 168.